United States Patent
Feng et al.

(10) Patent No.: US 10,691,239 B2
(45) Date of Patent: Jun. 23, 2020

(54) TOUCH DISPLAY SUBSTRATE, DRIVING METHOD THEREOF, AND TOUCH DISPLAY DEVICE

(71) Applicants: BOE Technology Group Co., Ltd., Beijing (CN); Hefei BOE Optoelectronics Technology Co., Ltd., Anhui (CN)

(72) Inventors: Silin Feng, Beijing (CN); Hongmin Li, Beijing (CN)

(73) Assignees: BOE TECHNOLOGY GROUP CO., LTD., Beijing (CN); HEFEI BOE OPTOELECTRONICS TECHNOLOGY CO., LTD., Anhui (CN)

( * ) Notice: Subject to any disclaimer, the term of this patent is extended or adjusted under 35 U.S.C. 154(b) by 7 days.

(21) Appl. No.: 16/003,267

(22) Filed: Jun. 8, 2018

(65) Prior Publication Data

US 2019/0064977 A1    Feb. 28, 2019

(30) Foreign Application Priority Data

Aug. 24, 2017  (CN) .......................... 2017 1 0736100

(51) Int. Cl.
*G06F 3/041*  (2006.01)
*G06F 3/044*  (2006.01)

(52) U.S. Cl.
CPC ............ *G06F 3/0412* (2013.01); *G06F 3/044* (2013.01); *G06F 3/0416* (2013.01)

(58) Field of Classification Search
None
See application file for complete search history.

(56) References Cited

U.S. PATENT DOCUMENTS

| 9,947,691 | B2 | 4/2018 | Jiang et al. |
| 10,031,614 | B2 | 7/2018 | Sung et al. |
| 2016/0027801 | A1 | 1/2016 | Jiang et al. |
| 2017/0003804 | A1 | 1/2017 | Sung et al. |
| 2017/0045964 | A1* | 2/2017 | Huang .................. G06F 3/0412 |

FOREIGN PATENT DOCUMENTS

| CN | 103811503 A | 5/2014 |
| CN | 106020556 A | 10/2016 |
| CN | 106652870 A | 5/2017 |
| CN | 106981252 A | 7/2017 |

OTHER PUBLICATIONS

Office Action, including Search Report, for Chinese Patent Application No. 201710736100.4, dated Nov. 5, 2019, 20 pages.

\* cited by examiner

*Primary Examiner* — Carl Adams
(74) *Attorney, Agent, or Firm* — Westman, Champlin & Koehler, P.A.

(57) ABSTRACT

A touch display substrate, a driving method of a touch display substrate, and a touch display device. The touch display substrate includes: a base substrate; a plurality of electrode patterns on the base substrate; signal lines in one-to-one correspondence with the electrode patterns; a compensation circuit on the base substrate, wherein the compensation circuit is configured to provide a common voltage signal to the electrode patterns in response to a touch control signal.

13 Claims, 6 Drawing Sheets

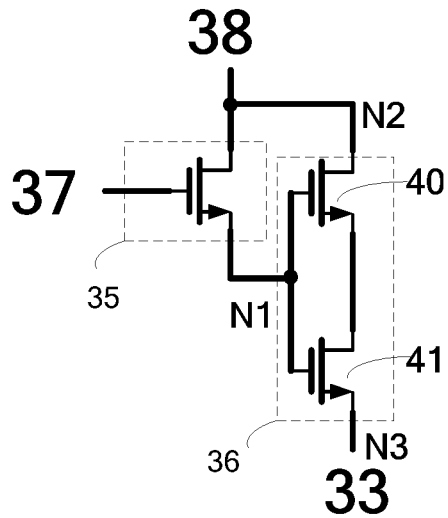

Fig. 5

| | |
|---|---|
| in a normal display period, providing an effective touch control signal to the control electrode of the first switch, so that the first switch is turned on and the decoupling sub-circuit is turned on, and the common voltage signal is outputted to the electrode patterns through the third terminal | 601 |
| in an initial stage and an end stage of a touch period, inputting a high-level touch control signal to the control electrode of the first switch, and inputting a low-level common voltage signal to the first electrode of the first switch, so that the first switch is turned on and the decoupling sub-circuit is turned off | 602 |
| in an intermediate stage of the touch period, inputting a low-level touch control signal to the control electrode of the first switch, so that the first switch is turned off and the decoupling sub-circuit is turned off | 603 |

Fig. 6

TOUCH DISPLAY SUBSTRATE, DRIVING METHOD THEREOF, AND TOUCH DISPLAY DEVICE

CROSS-REFERENCE TO RELATED APPLICATION

This application claims the priority benefit of Chinese Patent Application No. 201710736100.4 filed on Aug. 24, 2017 in the State Intellectual Property Office of China, the disclosure of which is incorporated herein by reference in entirety.

BACKGROUND

Technical Field

Embodiments of the present disclosure relate to the field of display technology, and in particular, to a touch display substrate, a driving method of a touch display substrate, and a touch display device.

Description of the Related Art

TDDI (Touch and Display Driver Integration) technology integrates a touch chip and a display chip together to form a single chip. In a touch display panel using the TDDI technology, a common electrode line layer is divided into a plurality of touch units, and by use of time-division multiplexing, it is used as a common electrode line in a normal display period to provide a common voltage signal and used as an electrode pattern in a touch period to provide a touch scan signal, to achieve integration of touch and display.

SUMMARY

At least one embodiment of the present disclosure provides a touch display substrate, comprising:
a base substrate;
a plurality of electrode patterns on the base substrate;
signal lines in one-to-one correspondence with the electrode patterns; and
a compensation circuit on the base substrate,
wherein the compensation circuit is configured to provide a common voltage signal to the electrode patterns in response to a touch control signal.

In an alternative embodiment, the compensation circuit comprises a first switch and a decoupling sub-circuit, wherein:
the first switch comprises a control electrode, a first electrode and a second electrode, the control electrode of the first switch is configured to receive the touch control signal, and the first electrode of the first switch is configured to receive the common voltage signal, and
the decoupling sub-circuit comprises a first terminal, a second terminal and a third terminal, the first terminal of the decoupling sub-circuit is coupled to the second electrode of the first switch, the second terminal of the decoupling sub-circuit is coupled to the first electrode of the first switch, and the third terminal of the decoupling sub-circuit is coupled to the signal line corresponding to one electrode pattern.

In an alternative embodiment, the decoupling sub-circuit comprises a second switch and a third switch, wherein:
the second switch comprises a control electrode, a first electrode and a second electrode, the control electrode of the second switch is coupled to the second electrode of the first switch, and the first electrode of the second switch is coupled to the first electrode of the first switch; and
the third switch comprises a control electrode, a first electrode and a second electrode, the control electrode of the third switch is coupled to the second electrode of the first switch, the first electrode of the third switch is coupled to the second electrode of the second switch, and the second electrode of the third switch is coupled to the signal line corresponding to one electrode pattern.

In an alternative embodiment, the control electrode of the second switch and the control electrode of the third switch serve as the first terminal of the decoupling sub-circuit, the first electrode of the second switch serves as the second terminal of the decoupling sub-circuit, and the second electrode of the third switch serves as the third terminal of the decoupling sub-circuit.

In an alternative embodiment, the touch display substrate comprises a plurality of the compensation circuits, and the compensation circuits are in one-to-one correspondence with the electrode patterns.

In an alternative embodiment, the first switch, the second switch and the third switch each is a P-type thin film transistor, or an N-type thin film transistor.

In an alternative embodiment, the touch display substrate further comprises a common electrode line on the base substrate, the common electrode line is coupled to the first electrode of the first switch.

In an alternative embodiment, the touch display substrate further comprises a driving circuit, the driving circuit being coupled to the compensation circuit, and the driving circuit being coupled to the electrode patterns through the signal lines.

In an alternative embodiment, the touch display substrate further comprises a driving circuit, the driving circuit being coupled to the compensation circuit, and the driving circuit being coupled to the electrode patterns via the signal lines, and
wherein the driving circuit is configured to output the touch control signal to the control electrode of the first switch, to output the common voltage signal to the first electrode of the first switch through a common electrode line, and to output a touch scan signal to the electrode patterns in a touch period and to output the common voltage signal to the electrode patterns in a normal display period.

An embodiment of the present disclosure provides a driving method of the above touch display substrate, comprising:
in a normal display period, providing a common voltage signal to the electrode patterns through signal lines by the compensation circuit in response to a touch control signal; and
in a touch period, stopping providing the common voltage signal to the electrode patterns by the compensation circuit in response to a touch control signal.

An embodiment of the present disclosure provides a driving method of the above touch display substrate, wherein the first switch is an N-type thin film transistor, and the driving method comprises:
in a normal display period, providing an effective touch control signal to the control electrode of the first switch, so that the first switch is turned on and the decoupling sub-circuit is turned on, and the common voltage signal is outputted to the electrode patterns through the third terminal;
in an initial stage and an end stage of a touch period, inputting a high-level touch control signal to the control electrode of the first switch, and inputting a low-level common voltage signal to the first electrode of the first switch, so that the first switch is turned on and the decoupling sub-circuit is turned off; and in an intermediate stage of the touch period, inputting a low-level touch control signal to the control electrode of the first switch, so that the first switch is turned off and the decoupling sub-circuit is turned off.

In an alternative embodiment, in the normal display period, inputting the common voltage signal to the electrode patterns through the signal lines; and in the touch period, inputting a touch scan signal to the electrode patterns through the signal lines.

An embodiment of the present disclosure provides a touch display device, comprising the above touch display substrate.

Other features and advantages of the present disclosure will be set forth in the following description, and at least a part of them will be obvious from the description, or will be learned by implementation of the present disclosure. The objectives and other advantages of the present disclosure may be realized and obtained by the structures particularly defined in the specification, the claims and the accompanying drawings.

BRIEF DESCRIPTION OF THE DRAWINGS

The accompanying drawings are used to provide a further understanding of the technical solutions of the embodiments of the present disclosure and constitute a part of the specification. They are used to explain the technical solutions of the present disclosure together with the embodiments of the present disclosure, but do not limit the technical solutions of the present disclosure.

FIG. 5 is a schematic view of a compensation circuit of the touch display substrate in FIG. 4;

FIG. 6 is a flowchart of a driving method of a touch display substrate according to an embodiment of the present disclosure;

DETAILED DESCRIPTION OF EMBODIMENTS

In order that the objectives, technical solutions, and advantages of the present disclosure can become clearer, the embodiments of the present disclosure will be described below in detail with reference to the accompanying drawings. It should be noted that, the embodiments and the features in the embodiments of the present disclosure can be combined with each other arbitrarily, unless they are contradicted.

Steps illustrated in the flowchart of the accompanying drawings may be performed in a computer system, incorporating such as a set of computer-executable instructions. Also, although a logical order is shown in the flowchart, in some cases, the illustrated or described steps may be performed in a different order.

Unless otherwise defined, technical terms or scientific terms used in the present disclosure should have the meanings as commonly understood by those skilled in the art to which the present disclosure belongs. The use of "first", "second", and the like in the present disclosure does not denote any order, quantity, or importance, but rather they merely serve to distinguish between different components. The use of "include" or "comprise" and the like means that the element or item preceding the word encompasses the elements or items listed behind the word and their equivalents, without excluding other elements or items. "Coupling" includes any direct or indirect means of electrical connection. "Up", "Down", "Left", "Right" and the like are only intended to represent relative positional relationships. If the absolute position of the described object is changed, the relative positional relationship may also be changed accordingly.

Figure 1:
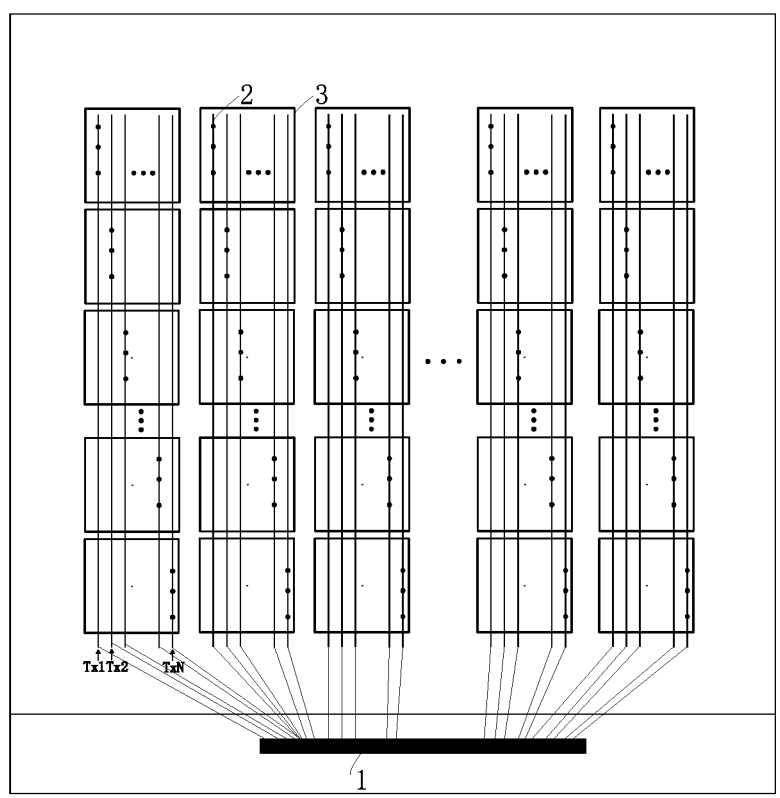
FIG. 1 is a schematic view of a touch display substrate in the related art.

FIG. 1 is a schematic view of a driving implementation of the TDDI technology in the related art. As shown in FIG. 1, a driving circuit 1 provides a driving signal to electrode patterns 3 through signal lines 2 (Tx, e.g., Tx1, Tx2, ..., TxN).

In a touch period, the signal line 2 provides a touch scan signal to the corresponding electrode pattern 3 to realize touch control; in order to ensure that capacitance loadings on various signal lines are the same as each other, each signal line extends throughout an entire display area.

In a normal display period, the signal line 2 provides a common voltage signal (VCOM) to the electrode pattern 3 to realize normal display.

It should be noted that, the electrode pattern in the present disclosure has two functions, including receiving a common electrode signal in the normal display period and receiving a touch scan signal in the touch period.

In the above driving mode, in the normal display period, since the signal lines have the same resistance, there is a difference in a voltage supply between the upper and lower electrode patterns, resulting in the occurrence of transversal stripes between the upper and lower electrode patterns. Because the resistance of the signal line corresponding to the electrode pattern at a distal end of the panel is the largest, the transversal stripes for the electrode pattern at the distal end of the panel are the most severe. Therefore, it is necessary to provide a solution to improve the transversal stripes.

At least one embodiment of the present disclosure provides a touch display substrate, a touch display device, and a driving method of a touch display substrate, so as to reduce the transversal stripes due to the integration of touch and display.

In the present disclosure, the common voltage is compensated by adding a compensation circuit, so that the coupling between the common voltage signal and the touch scan signal is reduced in addition to improving the transversal stripes. The present disclosure will be further described below with reference to specific embodiments.

Figure 2:
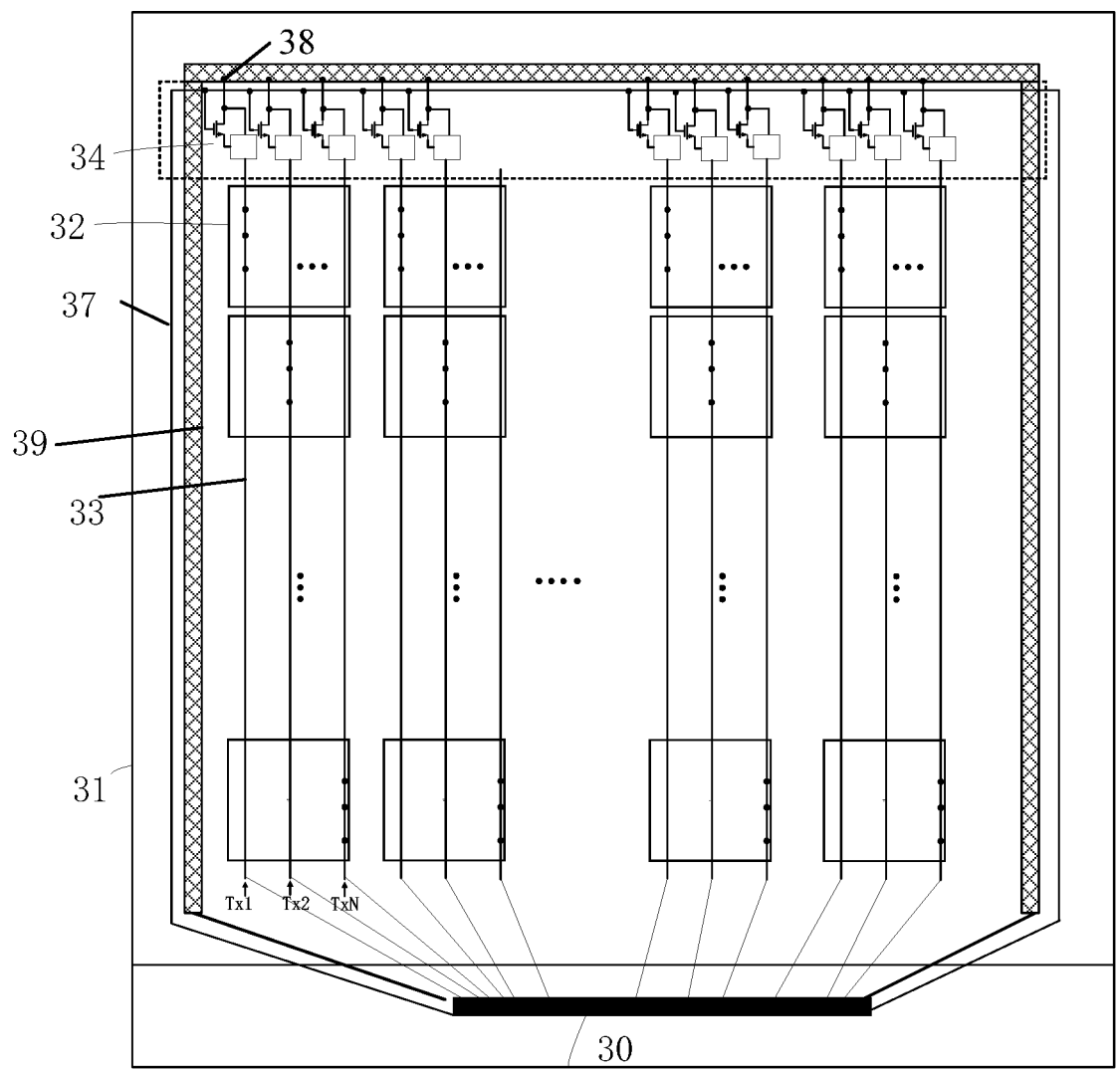
FIG. 2 is a schematic view of a touch display substrate according to an embodiment of the present disclosure.
Figure 3:
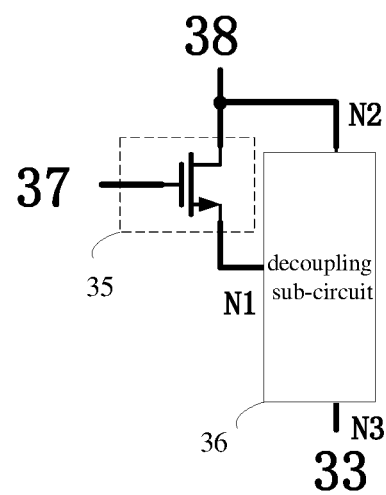
FIG. 3 is a schematic view of a compensation circuit of the touch display substrate in FIG. 2.

FIG. 2 is a schematic view of a touch display substrate according to an embodiment of the present disclosure, and FIG. 3 is a schematic view of a compensation circuit in FIG. 2. As shown in FIG. 2, an embodiment of the present disclosure provides a touch display substrate, including: a base substrate 31, a plurality of electrode patterns 32 located on the base substrate, signal lines 33 in one-to-one correspondence with the electrode patterns 32; compensation circuits 34 located on the base substrate. As shown in FIG.

3, the compensation circuits 34 each includes a first switch 35 and a decoupling sub-circuit 36.

The first switch 35 includes a control electrode, a first electrode and a second electrode. The control electrode of the first switch 35 is configured to receive a touch control signal 37, and the first electrode of the first switch 35 is configured to receive a common voltage signal 38.

The decoupling sub-circuit 36 includes a first terminal N1, a second terminal N2 and a third terminal N3, the first terminal N1 of the decoupling sub-circuit 36 is coupled to the second electrode of the first switch 35, the second terminal N2 of the decoupling sub-circuit 36 is coupled to the first electrode of the first switch 35, and the third terminal N3 of the decoupling sub-circuit 36 is coupled to a signal line 33 corresponding to one electrode pattern 32.

The first switch 35 is used to output a control signal to the decoupling sub-circuit 36 through its second electrode, to control the third terminal N3 of the decoupling sub-circuit 36 to output the common voltage signal to the electrode pattern 32, or control the decoupling sub-circuit 36 to be in an off state.

Herein, the plurality of electrode patterns 32 are generally arranged in an array. The signal lines 33 extend through the display area, and the signal lines 33 are in one-to-one correspondence with the electrode patterns 32, that is, each electrode pattern 32 is connected to one of the signal lines 33. The signal lines 33 are coupled to the respective electrode patterns 32, for example, the signal lines Tx1 to TxN respectively correspond to the electrode patterns in the first column from top to bottom. Specific settings of the electrode patterns 32 and the signal lines 33 may refer to the related art, and will not be described here.

In an alternative embodiment, controlling the third terminal N3 of the decoupling sub-circuit 36 to output the common voltage signal to the electrode pattern 32, or controlling the decoupling sub-circuit 36 to be in the off state includes:

controlling the decoupling sub-circuit 36 to output the common voltage signal to the electrode pattern 32 in a normal display period, and to be in the off state in the touch period.

In an alternative embodiment, the control electrode is a gate electrode, the first electrode is a drain electrode, and the second electrode is a source electrode. Certainly, if other switching devices are used, the control electrode, the first electrode and the second electrode respectively correspond to the terminals of the corresponding switching device.

In an alternative embodiment, the touch display substrate includes a plurality of the compensation circuits 34 in one-to-one correspondence with the electrode patterns 32, that is, each electrode pattern 32 is connected to one of the compensation circuits 34 through a signal line 33. That is, each compensation circuit 34 is coupled to the corresponding signal line of the electrode pattern 32 corresponding to the compensation circuit, so that each electrode pattern 32 has a compensation circuit 34 for voltage compensation in the normal display period.

In an alternative embodiment, the compensation circuits 34 are disposed in a non-touch area of the base substrate 31, for example, disposed above the touch area, herein the touch area is an area where the electrode patterns are located. Certainly, it is possible to set them at other positions as needed, which is not limited in the present disclosure.

In an alternative embodiment, the touch display substrate may further include a common electrode line 39 disposed on the base substrate 31 for outputting the common voltage signal 38 to the first electrode of the first switch 35.

In an alternative embodiment, as shown in FIG. 2, the touch display substrate further includes a driving circuit 30, the driving circuit 30 is coupled to the compensation circuits 34, and the driving circuit is coupled to the electrode patterns 32 through the signal lines 33.

The driving circuit 30 is configured to output the touch control signal 37 to the control electrode of the first switch 35, to output the common voltage signal 38 to the first electrode of the first switch 35 through the common electrode line 39, and to output a touch scan signal or the common voltage signal to the electrode pattern 32 through the signal line 33. In the touch period, the touch scan signal is outputted to the electrode pattern 32, and in the normal display period, the common voltage signal is outputted to the electrode pattern 32.

For example, the above-mentioned driving circuit 30 may be a touch and display integrating chip.

Figure 4:
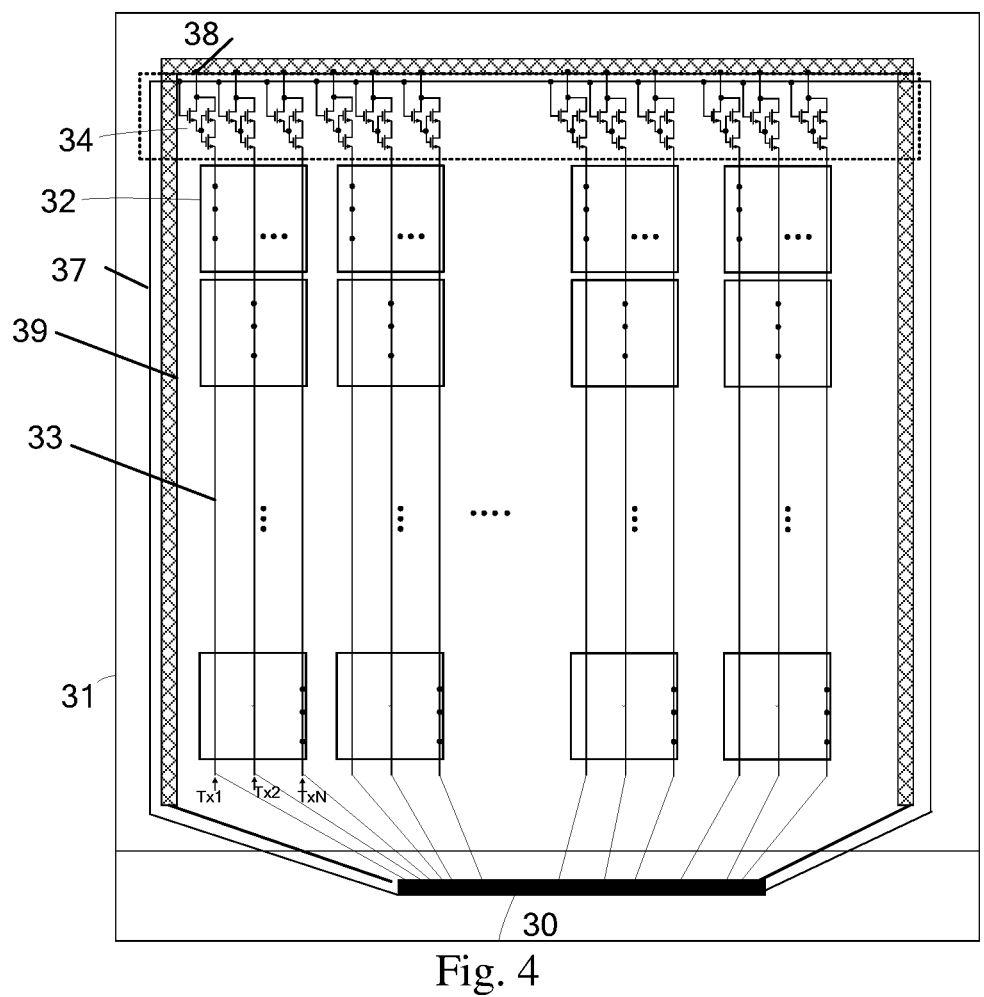
FIG. 4 is a schematic view of a touch display substrate according to another embodiment of the present disclosure.

FIG. 4 is a schematic view of a touch display substrate according to another embodiment of the present disclosure, and FIG. 5 is a schematic view of the compensation circuit in FIG. 4. As shown in FIG. 4, the touch display substrate according to this embodiment includes a base substrate 31, a plurality of electrode patterns 32 located on the base substrate, signal lines 33 in one-to-one correspondence with the electrode patterns 32, and compensation circuits 34 located on the base substrate. As shown in FIG. 5, the compensation circuit 34 includes a first switch 35 and a decoupling sub-circuit 36. This embodiment provides a specific implementation of the decoupling sub-circuit 36. For other circuits, please refer to the previous embodiment.

As shown in FIG. 5, the decoupling sub-circuit 36 includes a second switch 40 and a third switch 41.

The second switch 40 includes a control electrode, a first electrode and a second electrode, the control electrode of the second switch 40 is coupled to the second electrode of the first switch 35, and the first electrode of the second switch 40 is coupled to the first electrode of the first switch 35.

The third switch 41 includes a control electrode, a first electrode and a second electrode. The control electrode of the third switch 41 is coupled to the second electrode of the first switch 35. The first electrode of the third switch 41 is coupled to the second electrode of the second switch 40, and the second electrode of the third switch 41 is coupled to the signal line 33 corresponding to one electrode pattern.

The first switch 35, the second switch 40 and the third switch 41 each is a P-type thin film transistor or an N-type thin film transistor. Taking FIG. 5 as an example, the first switch 35, the second switch 40 and the third switch 41 shown in FIG. 5 are P-type thin film transistors, and the connection relationship is as follows:

The gate electrode of the first switch 35 receives the touch control signal 37, the drain electrode of the first switch 35 receives the common voltage signal 38, and the source electrode of the first switch 35 is coupled to the gate electrodes of the second switch 40 and the third switch 41. The drain electrode of the second switch 40 is coupled to the common voltage signal 38, the source electrode of the second switch 40 is coupled to the drain electrode of the third switch 41, and the source electrode of the third switch 41 is coupled to the signal line 33.

In other embodiments, the first switch 35, the second switch 40 and the third switch 41 described above may be replaced with N-type thin film transistors, and the connection relationship is the same as that of FIG. 5.

It should be noted that, the structure of the decoupling sub-circuit shown in FIG. 5 is only described as an example, and other structures may also be used. For example, more switch tubes may be used, as long as they can be turned on in the normal display period and turned off in the touch period, they will not be limited in the present disclosure.

FIG. 6 is a flowchart of a driving method of a touch display substrate according to an embodiment of the present disclosure. As shown in FIG. 6, the driving method includes:

Step 601: in the normal display period, providing an effective touch control signal 37 to the control electrode of the first switch 35, so that the first switch 35 is turned on and the decoupling sub-circuit 36 is turned on, thereby the common voltage signal is outputted to the electrode pattern 32 through the third terminal N3.

Step 602: in an initial stage and an end stage of a touch period, inputting a high-level touch control signal 37 to the control electrode of the first switch 35, and inputting a low-level common voltage signal to the first electrode of the first switch 35, so that the first switch 35 is turned on and the decoupling sub-circuit 36 is turned off.

Step 603: in an intermediate stage of the touch period, inputting a low-level touch control signal 37 to the control electrode of the first switch 35, so that the first switch 35 is turned off and the decoupling sub-circuit 36 is turned off.

By means of the above driving method, in the normal display period, the first switch 35, the second switch 40 and the third switch 41 are turned on, and the common voltage signal is inputted into the corresponding electrode pattern 32 through the second switch 40 and the third switch 41, so that the common voltage signal is transmitted to each electrode pattern. In this way, the common voltages applied to the electrode patterns are equal to each other, the common voltage supply is enhanced, and the common voltage difference between the upper and lower electrode patterns is reduced, thereby eliminating the transversal stripes due to the difference of the common voltage supply on the electrode patterns in the normal display period. In the touch period, the second switch 40 and the third switch 41 are turned off, thus it does not affect the normal operation of the touch. In addition, the serial structure of the second switch 40 and the third switch 41 reduces the coupling between the common voltage signal and the touch scan signal, thereby improving touch performance.

In an alternative embodiment, in the normal display period, the common voltage signal is inputted to the electrode pattern 32 through the signal line 33; and in the touch period, the touch scan signal is inputted to the electrode pattern 32 through the signal line 33.

In this embodiment, the common voltage signal or the touch scan signal is inputted to the electrode pattern 32 by the driving circuit through the signal line 33, to realize the display and the touch in a time-division manner. In addition, in the normal display period, the common voltage signal is inputted to the electrode pattern through the common electrode line 39 and the compensation circuit 34, to increase the common voltage supply, thereby improving the transversal stripes.

The driving process according to the present disclosure will be described with reference to an embodiment.

Figure 7:
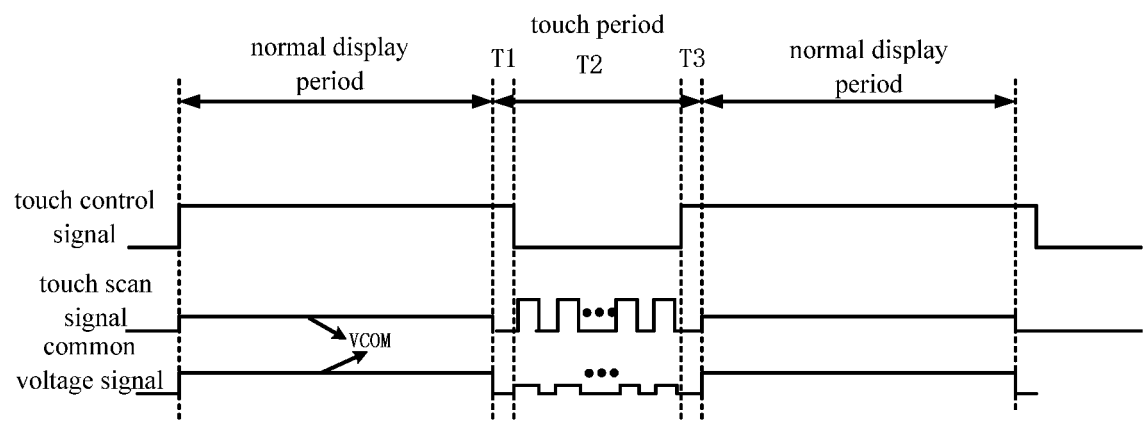
FIG. 7 is a timing diagram of driving signals according to an embodiment of the present disclosure.
Figure 8:
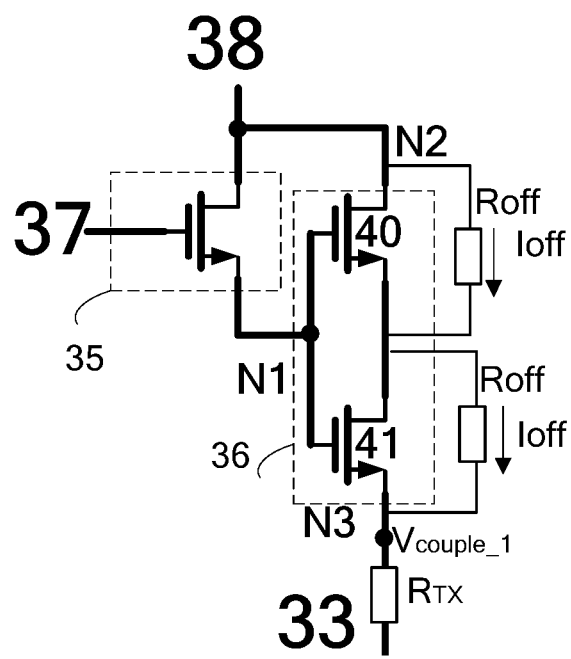
FIG. 8 is a schematic view of coupling according to an embodiment of the present disclosure.

FIG. 7 is a timing diagram of driving signals in case that the touch display substrate is driven. As shown in FIG. 7, the timing of the drive signals includes:

in the normal display period: the touch control signal is at a high level, and the driving circuit outputs the common voltage signal to the electrode pattern 32 through the signal line Tx. At this time, the first switch 35 is turned on, the terminal N1 is at a high level, and the second switch 40 and the third switch 41 are turned on, then the common voltage signal is inputted into the corresponding electrode pattern 32 through the second switch 40 and the third switch 41, thereby the common voltage signal is transmitted to each electrode pattern. In this way, the common voltages applied to the electrode patterns are equal to each other, the common voltage supply is enhanced, and the common voltage difference between the upper and lower electrode patterns is reduced, thereby eliminating the transversal stripes due to the difference of the common voltage supply on the electrode patterns in the normal display period.

In the touch period:

in the initial stage (T1 stage): the touch control signal is still at a high level, and the first switch 35 is turned on. At this time, the common voltage signal is at a low level, so the terminal N1 is at a low level, then the second switch 40 and the third switch 41 are turned off. The turn-off state of the second switch 40 and the third switch 41 ensures the normal operation of the touch. Furthermore, the serial structure of the second switch 40 and the third switch 41 reduces the coupling between the common voltage signal and the touch scan signal, thereby improving touch performance.

In the intermediate stage (T2 stage): the touch control signal is at a low level, the first switch 35 is turned off, and the second switch 40 and the third switch 41 are turned off. The turn-off state of the second switch 40 and the third switch 41 ensures the normal operation of the touch. Furthermore, the serial structure of the second switch 40 and the third switch 41 reduces the coupling between the common voltage signal and the touch scan signal, thereby improving touch performance.

In the end stage (T3 stage): similar to the initial stage (T1 stage), the touch control signal is at a high level, and the first switch 35 is turned on. At this time, the common voltage signal is at a low level, so the terminal N1 is at a low level, then the second switch 40 and the third switch 41 are turned off. The turn-off state of the second switch 40 and the third switch 41 ensures the normal operation of the touch. Furthermore, the serial structure of the second switch 40 and the third switch 41 reduces the coupling between the common voltage signal and the touch scan signal, thereby improving touch performance.

Next, it will further explain why the serial structure of the second switch 40 and the third switch 41 reduces the coupling between the common voltage signal and the touch scan signal.

When the second switch 40 and the third switch 41 are turned off, there will be a turn-off current $I_{off}$. Due to the presence of $I_{off}$, the common voltage signal 38 affects the signal on the signal line 33, that is, the coupling occurs. Assuming that the coupling voltage caused by the common voltage signal 38 is $V_{couple\_1}$, the voltage of the common voltage signal 38 is $V_{com}$, and the voltage on the signal line is $V_{TX}$, and for the sake of simplicity, assuming that the equivalent resistances of the second switch 40 and the third switch 41 are the same after they are turned off, i.e., $R_{off}$, and the equivalent resistance of the signal line is $R_{TX}$, then $$V_{couple\_1} = \frac{R_{TX}}{R_{off} + R_{off} + R_{TX}} \times (V_{COM} - V_{TX})$$

Figure 9:
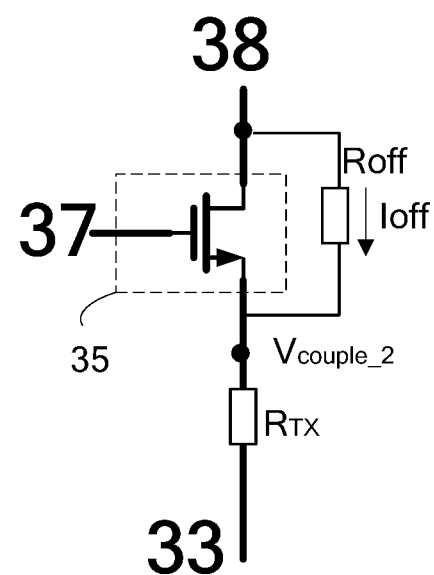
FIG. 9 is a schematic view of coupling according to an embodiment of the present disclosure.

If there are no second switch 40 and third switch 41, for example, it is implemented as shown in FIG. 9, the source electrode of the first switch 35 is directly connected to the signal line 33. For the sake of simplicity, assuming that the equivalent resistance of the first switch 35 is also $R_{off}$ after it is turned off, then the coupling voltage $V_{couple\_2}$ is:

$$V_{couple\_2} = \frac{R_{TX}}{R_{off} + R_{TX}} \times (V_{COM} - V_{TX})$$

It can be seen that $V_{couple\_1}$ is smaller than $V_{couple\_2}$. Therefore, the serial structure of the second switch 40 and the third switch 41 reduces the coupling of the common voltage signal and the touch scan signal. And so on, the coupling can be further reduced if more cascade switches are used.

An embodiment of the present disclosure provides a touch display device including the touch display substrate as described in any one of the above embodiments. The touch display device may be any product or component having a display function such as a mobile phone, a tablet computer, a television, a monitor, a notebook computer, a digital photo frame, a navigator, and the like. Other essential components of the display device may be implemented by those skilled in the art, therefore they will not be described herein, and they should not be taken as limiting the present disclosure. For the implementation of the display device, reference may be made to the above-described embodiment of the touch display substrate, which will not be described repeatedly.

Compared with the related art, the technical solution according to the present application can improve the transversal stripes and improve the display effect by increasing the common voltage supply of the electrode patterns. In addition, the touch performance is guaranteed while reducing the transversal stripes.

It should be noted that, the drawings the present disclosure only involve the structures related to the embodiments of the present disclosure, and other structures may refer to the common designs. The embodiments and the features in the embodiments of the present disclosure can be combined with each other to obtain new embodiments unless they are not contradicted.

Although the embodiments of the present disclosure have been described above, the described contents are merely some embodiments intended to facilitate the understanding of the present disclosure and are not intended to limit the present disclosure. Any modifications and changes may be made by those skilled in the art in the implementation forms and the details without departing from the spirit and scope of the present disclosure, but the scope of the present disclosure is defined by the appended claims.

What is claimed is:

1. A touch display substrate, comprising:
a base substrate;
a plurality of electrode patterns on the base substrate;
signal lines in one-to-one correspondence with the electrode patterns; and
a compensation circuit on the base substrate
wherein the compensation circuit is configured to provide a common voltage signal to the electrode patterns in response to a touch control signal,
wherein the compensation circuit comprises a first switch and a decoupling sub-circuit, wherein:
the first switch comprises a control electrode, a first electrode and a second electrode, the control electrode of the first switch is configured to receive the touch control signal, and the first electrode of the first switch is configured to receive the common voltage signal, and
the decoupling sub-circuit comprises a first terminal, a second terminal and a third terminal, the first terminal of the decoupling sub-circuit is coupled to the second electrode of the first switch, the second terminal of the decoupling sub-circuit is coupled to the first electrode of the first switch, and the third terminal of the decoupling sub-circuit is coupled to the signal line corresponding to one electrode pattern,
wherein the decoupling sub-circuit comprises a second switch and a third switch, wherein:
the second switch comprises a control electrode, a first electrode and a second electrode, the control electrode of the second switch is coupled to the second electrode of the first switch, and the first electrode of the second switch is coupled to the first electrode of the first switch; and
the third switch comprises a control electrode, a first electrode and a second electrode, the control electrode of the third switch is coupled to the second electrode of the first switch, the first electrode of the third switch is coupled to the second electrode of the second switch, and the second electrode of the third switch is coupled to the signal line corresponding to one electrode pattern.

2. The touch display substrate according to claim 1, wherein the control electrode of the second switch and the control electrode of the third switch serve as the first terminal of the decoupling sub-circuit, the first electrode of the second switch serves as the second terminal of the decoupling sub-circuit, and the second electrode of the third switch serves as the third terminal of the decoupling sub-circuit.

3. The touch display substrate according to claim 1, wherein the first switch, the second switch and the third switch each is a P-type thin film transistor, or an N-type thin film transistor.

4. The touch display substrate according to claim 1, wherein the touch display substrate further comprises a common electrode line on the base substrate, wherein the common electrode line is coupled to the first electrode of the first switch.

5. The touch display substrate according to claim 1, wherein the touch display substrate further comprises a driving circuit, the driving circuit being coupled to the compensation circuit, and the driving circuit being coupled to the electrode patterns via the signal lines, and
wherein the driving circuit is configured to output the touch control signal to the control electrode of the first switch, to output the common voltage signal to the first electrode of the first switch through a common electrode line, and to output a touch scan signal to the electrode patterns in a touch period and to output the common voltage signal to the electrode patterns in a normal display period.

6. A driving method of the touch display substrate according to claim 1, comprising:
in a normal display period, providing a common voltage signal to the electrode patterns through signal lines by the compensation circuit in response to a touch control signal; and
in a touch period, stopping providing the common voltage signal to the electrode patterns by the compensation circuit in response to a touch control signal.

7. A driving method of the touch display substrate according to claim 1, wherein the first switch is an N-type thin film transistor, and the driving method comprises:
in a normal display period, providing an effective touch control signal to the control electrode of the first switch, so that the first switch is turned on and the decoupling sub-circuit is turned on, and the common voltage signal is outputted to the electrode patterns through the third terminal;

in an initial stage and an end stage of a touch period, inputting a high-level touch control signal to the control electrode of the first switch, and inputting a low-level common voltage signal to the first electrode of the first switch, so that the first switch is turned on and the decoupling sub-circuit is turned off; and in an intermediate stage of the touch period, inputting a low-level touch control signal to the control electrode of the first switch, so that the first switch is turned off and the decoupling sub-circuit is turned off.

8. The driving method according to claim 7, wherein
in the normal display period, inputting the common voltage signal to the electrode patterns through the signal lines; and
in the touch period, inputting a touch scan signal to the electrode patterns through the signal lines.

9. A touch display device, comprising the touch display substrate according to claim 1.

10. The touch display substrate according to claim 1, wherein the touch display substrate comprises a plurality of the compensation circuits, and the compensation circuits are in one-to-one correspondence with the electrode patterns.

11. The touch display substrate according to claim 1, wherein the touch display substrate further comprises a driving circuit, the driving circuit being coupled to the compensation circuit, and the driving circuit being coupled to the electrode patterns through the signal lines.

12. A driving method of the touch display substrate,
wherein the touch display substrate comprises:
a base substrate;
a plurality of electrode patterns on the base substrate;
signal lines in one-to-one correspondence with the electrode patterns; and
a compensation circuit on the base substrate,
wherein the compensation circuit is configured to provide a common voltage signal to the electrode patterns in response to a touch control signal, wherein the compensation circuit comprises a first switch and a decoupling sub-circuit, wherein:
the first switch comprises a control electrode, a first electrode and a second electrode, the control electrode of the first switch is configured to receive the touch control signal, and the first electrode of the first switch is configured to receive the common voltage signal, and
the decoupling sub-circuit comprises a first terminal, a second terminal and a third terminal, the first terminal of the decoupling sub-circuit is coupled to the second electrode of the first switch, the second terminal of the decoupling sub-circuit is coupled to the first electrode of the first switch, and the third terminal of the decoupling sub-circuit is coupled to the signal line corresponding to one electrode pattern,
wherein the first switch is an N-type thin film transistor, and the driving method comprises:
in a normal display period, providing an effective touch control signal to the control electrode of the first switch, so that the first switch is turned on and the decoupling sub-circuit is turned on, and the common voltage signal is outputted to the electrode patterns through the third terminal;
in an initial stage and an end stage of a touch period, inputting a high-level touch control signal to the control electrode of the first switch, and inputting a low-level common voltage signal to the first electrode of the first switch, so that the first switch is turned on and the decoupling sub-circuit is turned off; and
in an intermediate stage of the touch period, inputting a low-level touch control signal to the control electrode of the first switch, so that the first switch is turned off and the decoupling sub-circuit is turned off.

13. The driving method according to claim 12, wherein
in the normal display period, inputting the common voltage signal to the electrode patterns through the signal lines; and
in the touch period, inputting a touch scan signal to the electrode patterns through the signal lines.

* * * * *